(12) United States Patent
Taeger

(10) Patent No.: US 6,675,954 B2
(45) Date of Patent: Jan. 13, 2004

(54) CONVEYOR SYSTEM ACCESSORIES

(76) Inventor: Jerry Taeger, 39126 Alston Ave., Zephyrhills, FL (US) 33540

( * ) Notice: Subject to any disclaimer, the term of this patent is extended or adjusted under 35 U.S.C. 154(b) by 0 days.

(21) Appl. No.: 10/452,758

(22) Filed: Jun. 2, 2003

(65) Prior Publication Data

US 2003/0192772 A1 Oct. 16, 2003

Related U.S. Application Data

(62) Division of application No. 09/818,460, filed on Mar. 27, 2001, now Pat. No. 6,588,579.

(51) Int. Cl.[7] ............................................... B65G 12/32
(52) U.S. Cl. ................... 198/687.1; 104/172.1
(58) Field of Search .......................... 198/465.1, 465.4, 198/424.1, 687.1, 867.14, 802; 104/93, 172.1–172.3

(56) References Cited

U.S. PATENT DOCUMENTS

| | | | | |
|---|---|---|---|---|
| 4,368,037 A | * | 1/1983 | Limque et al. | 198/465.4 |
| 4,464,996 A | * | 8/1984 | Veith | 104/93 |
| 4,860,662 A | * | 8/1989 | Matsumoto et al. | 104/93 |
| 6,588,579 B2 | * | 7/2003 | Taeger | 198/687.1 |

* cited by examiner

*Primary Examiner*—Joseph E. Valenza
(74) *Attorney, Agent, or Firm*—Dennis G. LaPointe; Mason Law, P.A.

(57) ABSTRACT

Conveyor system accessories are disclosed, which provide an inexpensive way to stage, stockpile and/or sort work pieces and provides easy entry to and exit from a main conveyor. In particular, a trolley or trolleys that carry work pieces ride on the conveyor rail above the chain or intermesh with the chain on the inside of the track. These accessories are used with single track continuous conveyor systems, which greatly enhances the productivity of the single track system by permitting work pieces to be taken off-line without taking the work piece off a load pendant.

3 Claims, 13 Drawing Sheets

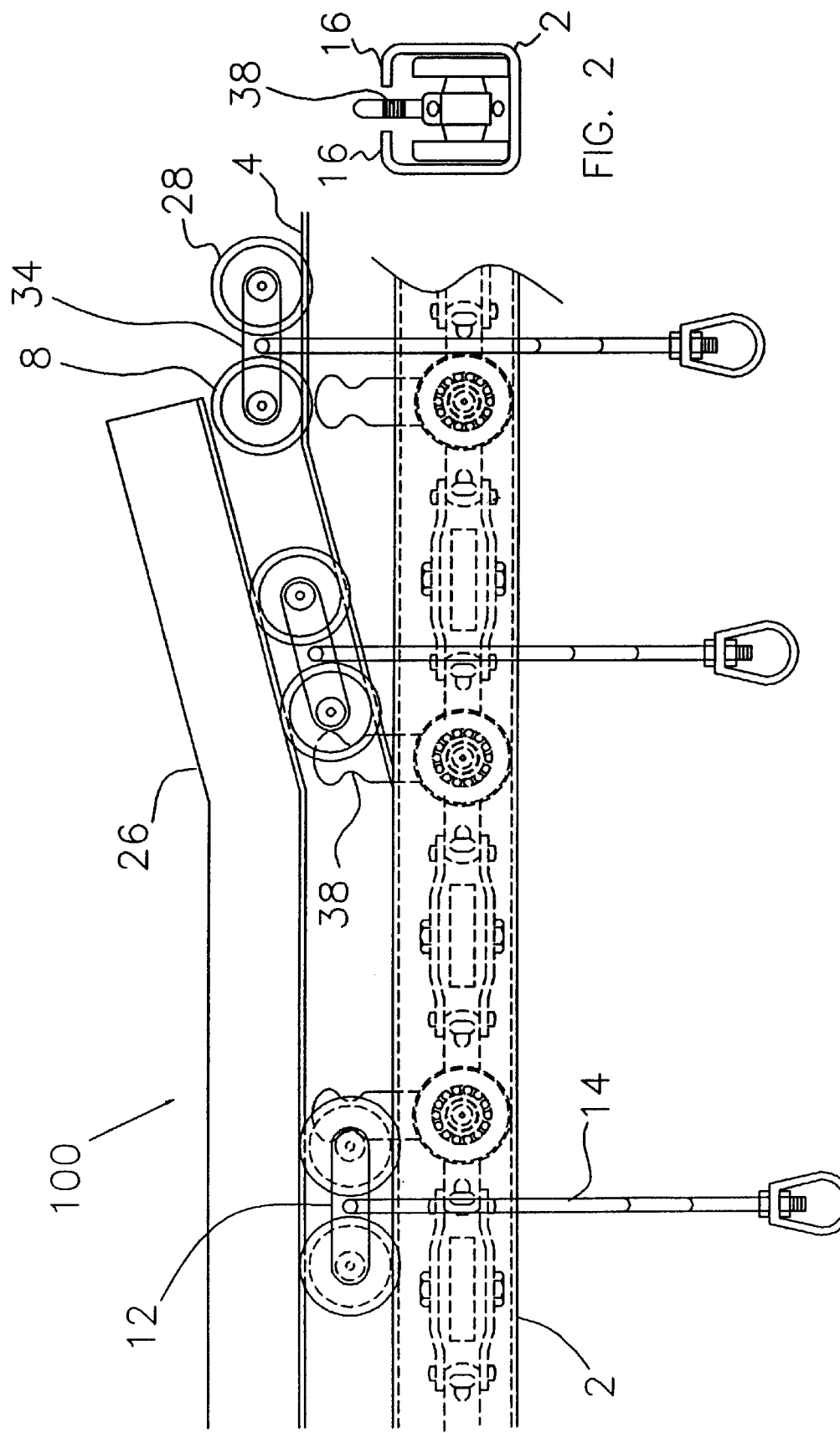

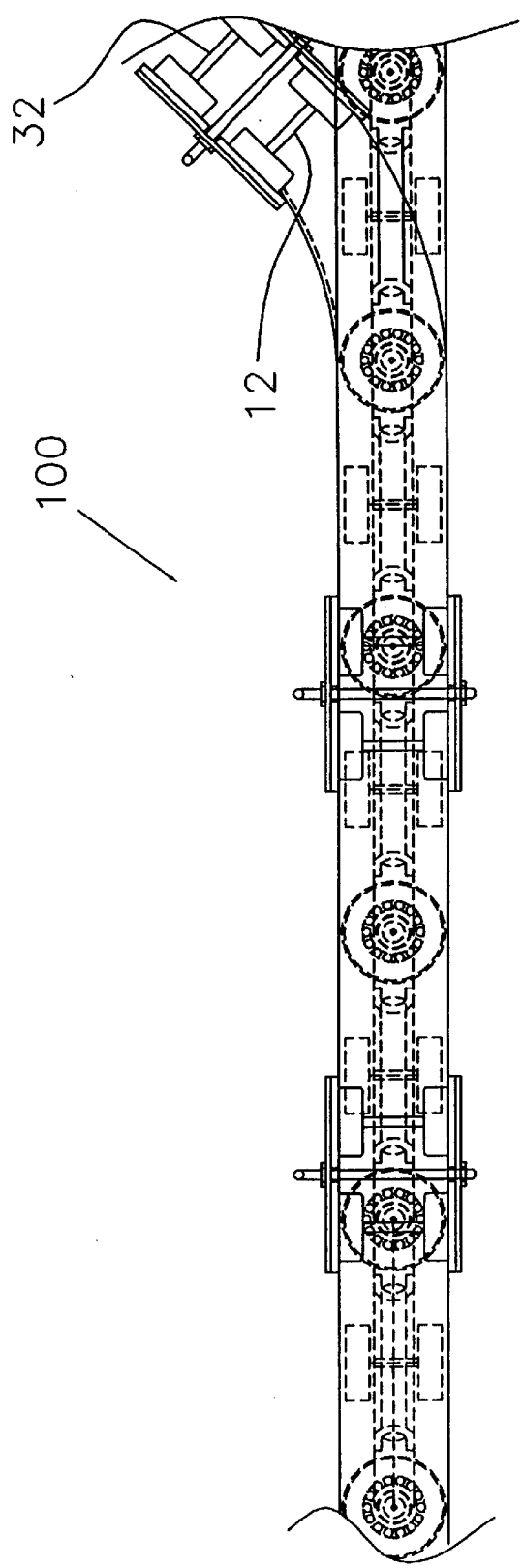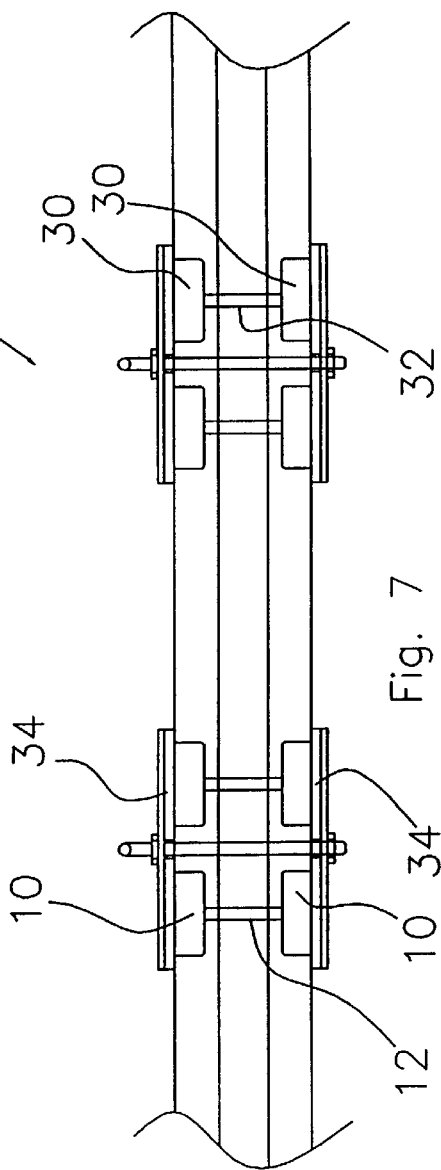
Fig. 6
Fig. 7

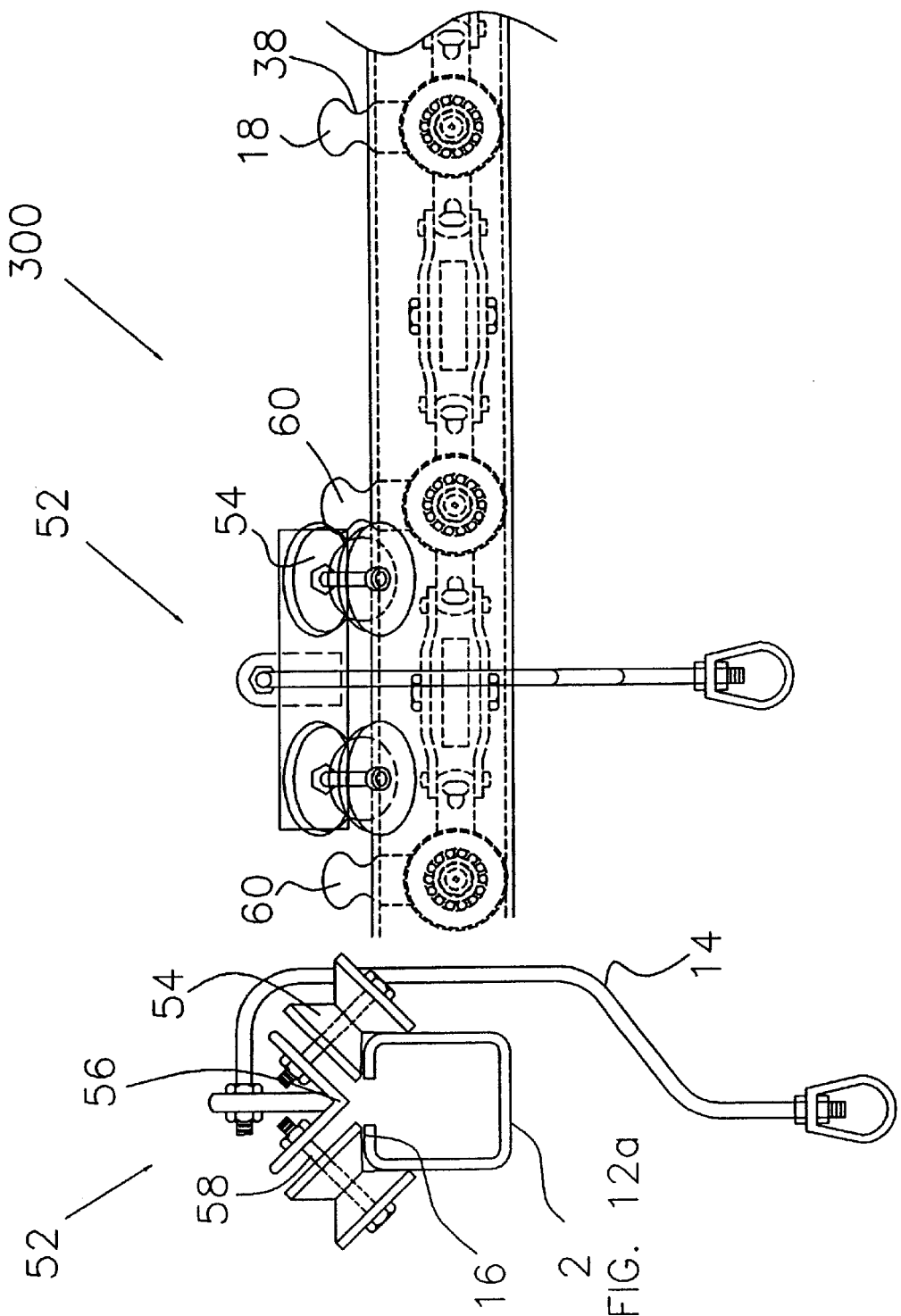

CONVEYOR SYSTEM ACCESSORIES

RELATED APPLICATION

This application is a division application of U.S. application Ser. No. 09/818,460 filed Mar. 27, 2000 now U.S. Pat. No. 6,588,579.

BACKGROUND OF THE INVENTION

1. Field of the Invention

This invention relates, generally, to novel conveyor system accessories for loading and unloading a work piece from a conveyor system. The present invention provides an inexpensive way to stage, stockpile and/or sort work pieces and provides easy entry to and exit from a main conveyor. Alternatively, work pieces may reenter the main conveyor, if desired. Specifically, a trolley or trolleys that carry work pieces ride on the conveyor rail above the chain or intermesh with the chain on the inside of the track. These accessories are used with single track continuous conveyor systems, which greatly enhances the productivity of the single track system by permitting work pieces to be taken off-line without taking the work piece off a load pendant.

2. Description of the Related Art

Conventional overhead trolley carriers are known in the art. One such type is a continuous flow conveyor. The continuous flow conveyor is restricted by a moving chain, which severely limits the utility of this type of conveyor. Specifically, when it is necessary to remove a work piece from the conveyor it is necessary to take it off a load pendant. Generally, the removal of the work piece from the load pendant requires disengagement of the conveyor drive train, thus stopping motion of the conveyor. Alternatively, if complete stoppage of the conveyor is to be avoided, the conveyor must be slowed down considerably to facilitate the removal of the work piece from the load pendant. Both methods of unloading, however, greatly impact the productivity of the conveyor system.

More recently, power and free conveyor systems have been developed to overcome the problems associated with the staging, stockpiling, and/or sorting of work pieces in continuous flow conveyors. Power and free systems have a power track and a carrier track arranged in vertically spaced relation. The power track is an endless chain supported by trolleys mounted on the power track, and longitudinally spaced pushers carried by the chain. A pusher is engageable with a driving dog on the front end of a load carrier, and disengaging means associated with the driving dog is operable by actuating means on the rear end of a preceding load carrier so that successive load carriers can automatically accumulate behind a stopped load carrier. Power and free conveyors overcome many of the problems associated with continuous flow conveyors. These power and free conveyors are, however, generally more than twice as expensive as continuous flow conveyors.

In view of the prior art at the time the present invention was made, it was not obvious to those of ordinary skill in the pertinent art how the needed inexpensive yet efficient staging, stockpiling, and/or sorting conveyor system could be provided.

SUMMARY OF THE INVENTION

In accordance with the present invention, a single track continuous conveyor system accessory is provided. In one embodiment of the present invention the conveyor system accessory is a wheel assembly for riding on top of an inverted continuous conveyor track. The wheel assembly has a pair of wheels, which are spaced apart in a parallel side by side relationship and are connected to one another by a transverse axle. A drive means for a conveyor chain is positioned in the inverted continuous conveyor track to engage the wheel assembly and move it in a desired direction. A carrying means for transporting a work piece is rotatably attached to the wheel assembly. The present invention also includes a loading means for positioning the wheel assembly on the top surface of the inverted continuous conveyor track and an unloading means for removing the wheel assembly from the top surface of the inverted continuous conveyor track.

A second wheel assembly is provided for the transport of heavy loads and is used in conjunction with the wheel assembly. In particular, the second wheel assembly has a second pair of wheels, which are spaced apart in a parallel side by side relationship and are connected to one another by a second transverse axle. The second wheel assembly is connected to the wheel assembly by a pair of longitudinal members with one end of each pair of longitudinal members rotatably connected to the transverse axle and an opposite end of each pair of longitudinal members rotatably connected to the second transverse axle. Loading means and unloading means are also provided for positioning and removing the combination of the wheel assembly and second wheel assembly on and from the inverted continuous conveyor track, respectively.

The conveyor system accessory may also include an alignment means for maintaining the wheel assembly and the combination of the wheel assembly and the second wheel assembly on the top surface of the inverted continuous conveyor track. The alignment means is a plate which is fixedly attached to each of the wheels of the pair of wheels of the wheel assembly and the second wheel assembly. The plates are situated on an external surface of each of the wheels, are perpendicular to the transverse axle, and extend beyond each wheel and overlap a portion of both sides of the inverted continuous conveyor track to form a boundary means for maintaining the wheel assembly in combination with the second wheel assembly on the top surface of the inverted continuous conveyor track.

The present system also provides a drive means, which is a vertically oriented elongate planar shaped member that is fixed at one end to the conveyor chain. The opposite end has notches on both sides for engaging the transverse axle of the wheel assembly in combination with the second transverse axle of the second wheel assembly.

In an alternative embodiment the wheel assembly meshes with the inverted continuous conveyor track. In this embodiment, the wheel assembly defines an inverted V-shaped assembly having a transverse member across an apex of the V-shaped assembly. The transverse member has rollers on either side of the apex for rolling on a ramp. The inverted V-shaped assembly is attached to a housing, which has a pair of wheels at its front end and a pair of wheels at its rear end. The pairs of wheels are spaced apart in a parallel side by side relationship and are connected to the housing. A drive means is positioned in the inverted continuous track and engages the wheel assembly and moves the wheel assembly in a desired direction. A carrying means for transporting a work piece is rotatably attached to the wheel assembly. Loading and unloading means for facilitating the intermeshing and disengagement, respectively, of the wheel assembly are also provided.

The housing of the present invention is an inverted U-shaped assembly with a cut out or slot portion for engagement of the drive means. The inverted U-shaped member allows the respective pairs of wheels of the wheel assembly to straddle a drive portion of the drive means and effectively intermesh with the drive means.

In yet a further embodiment, a wheel assembly for riding on a top surface of an inverted continuous conveyor track has a pair of V-shaped rollers. The V-shaped rollers are spaced apart and aligned to engage the upper most corners of the inverted continuous conveyor track and are fixedly attached to a V-shaped angle member by a transverse axle. A drive means is also provided. The drive means engages the V-shaped angle member and moves the wheel assembly in a desired direction. The wheel assembly has a carrying means for transporting a work piece, which is rotatably attached to the wheel assembly. Loading and unloading means are provided.

The invention accordingly comprises the features of construction, combination of elements and arrangement of parts that will be exemplified in the following description, taken together with the accompanying drawings, and its scope, will be pointed out in the appended claims.

BRIEF DESCRIPTION OF THE DRAWINGS

For a fuller understanding of the nature of the invention, reference should be made to the following detailed description; taken in connection with the accompanying drawings, in which:

FIG. 1 is a side view of a dual axle conveyor system accessory of the present invention;

FIG. 2 is an end view or cross section of FIGS. 1, 3, 4, and 5;

FIG. 6 is a top plan view of the dual axle conveyor system accessory of FIG. 1 entering a main conveyor from staging;

FIG. 7 is a further top plan view of the conveyor system accessory of FIG. 1 with the conveyor chain removed for clarity;

FIG. 12 is a side view of another conveyor system accessory of the present invention;

FIG. 12a is a cross section of a conveyor system accessory of FIG. 12;

DETAILED DESCRIPTION OF THE INVENTION

Figure 4:
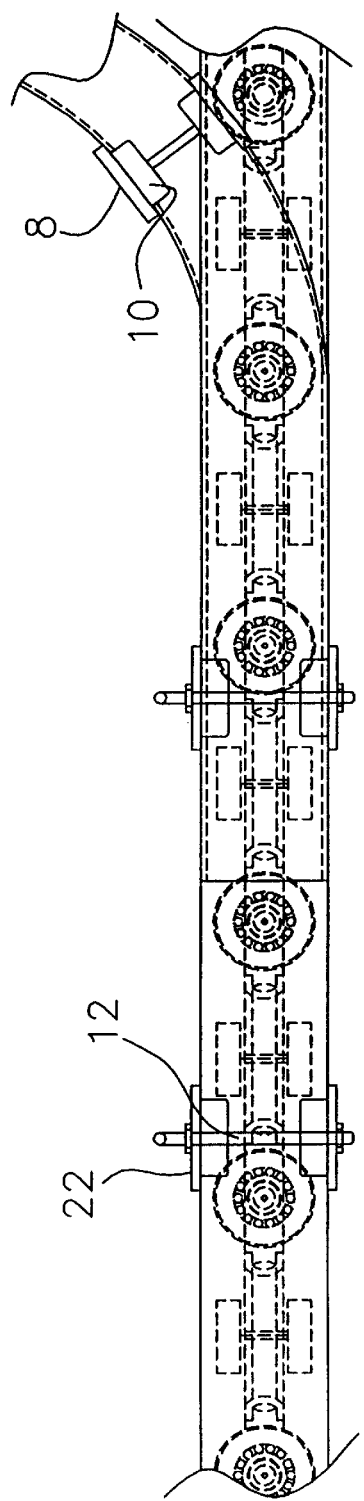
FIG. 4 is a top plan view of the single axle conveyor system accessory of FIG. 3.

The conveyor system accessories of the present invention can be used with any commercially available single track continuous conveyor, such as those available from Rapid Industries, Inc. Louisville, Ky., Richards-Wilcox, Inc., Aurora, Ill., and Webb Inc., Farmington Hills, Mich. For purposes of the present invention the conveyor track is installed in an inverted position. Referring now to the drawings, in which like numerals refer to like elements thereof, FIG. 1, shows an embodiment of the invention denoted as a whole by reference numeral 100.

Figure 5:
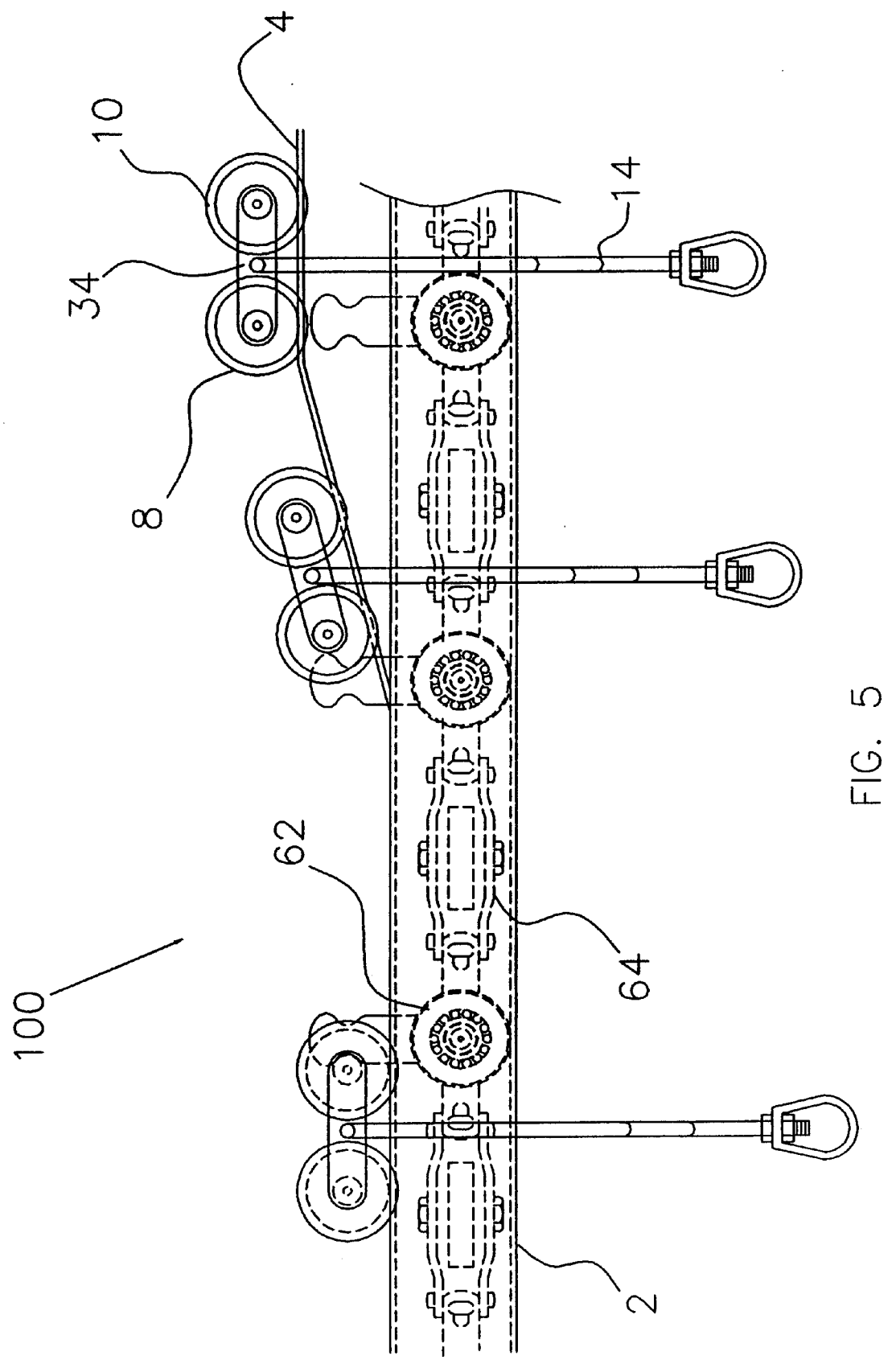
FIG. 5 is the side view of the dual axle conveyor system accessory of FIG. 1, without an angle iron guide.

As shown in FIGS. 1 and 5, a wheel assembly 8 in combination with a second wheel assembly 28 rides on a top surface 16 of an inverted continuous conveyor track 2. Plan views of this embodiment are shown in FIGS. 6 and 7. Each of the first wheel assembly 8 and the second wheel assembly 28 has a pair of wheels 10 and a second pair of wheels 30, respectively. The pair of wheels 10 and the second pair of wheels 30 are spaced apart in a parallel side by side relationship and are connected to one another by a transverse axle 12 and a second transverse axle 32, respectively.

The second wheel assembly 28 is connected to the wheel assembly 8 by a pair of longitudinal members 34. One end of each of the pairs of longitudinal members 34 is rotatably connected to the transverse axle 12, while an opposite end of each of the pairs of longitudinal members 34 is rotatably connected to the second transverse axle 32. Wheel assembly 8 in combination with a second wheel assembly 28 is particularly useful in heavy load applications or applications in which the work piece may be awkwardly sized and requires the additional stability provided by wheel assembly 8 in combination with a second wheel assembly 28.

Figure 3:
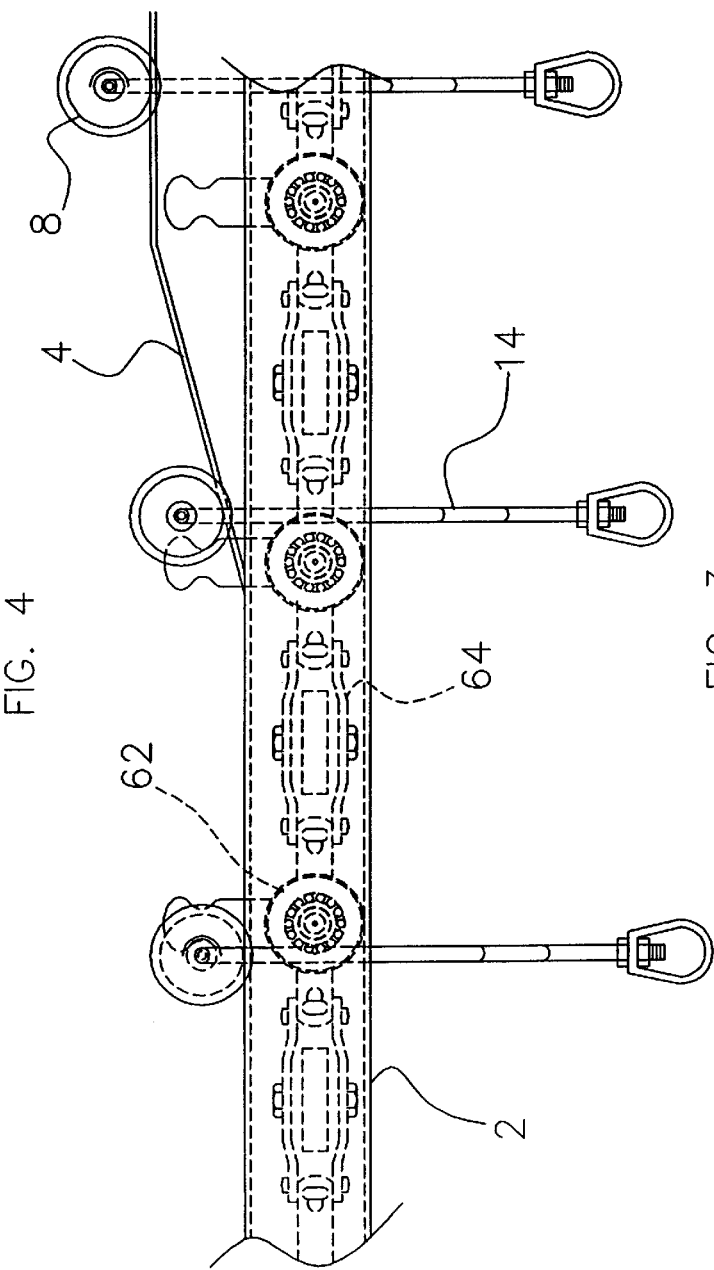
FIG. 3 is a side view of a single axle conveyor system accessory of the present invention.
Figure 12B:
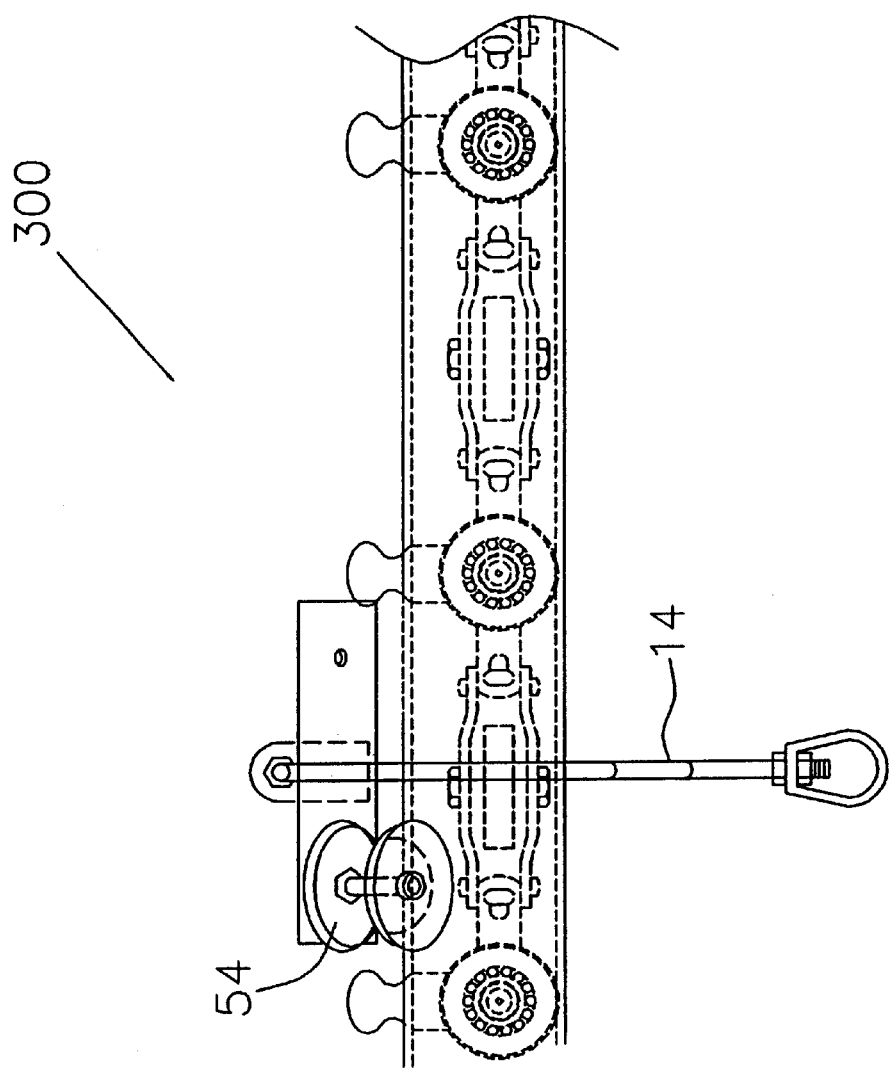
FIG. 12b is a further side view of FIG. 12 showing a push bar moving a part carrier on the rail with the rear wheels removed for clarity.
Figure 12C:
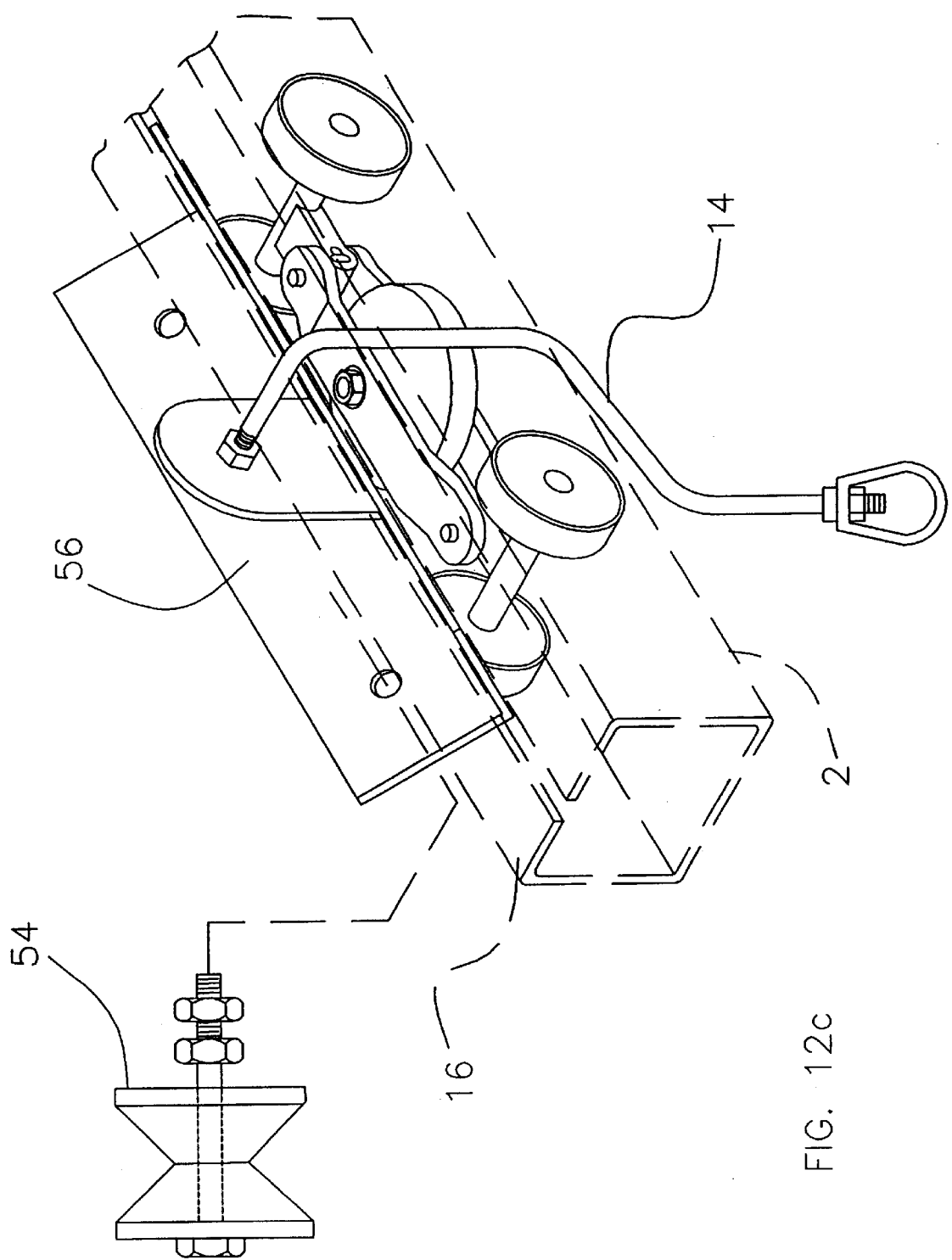
FIG. 12c is a isometric view of FIG. 12.

Drive means 18, also called a dog or a pusher, of conveyor chain 20 is positioned in the inverted conveyor track 2 to engage the wheel assembly 8 in combination with the second wheel assembly 28 and to move the wheel assemblies 8 and 28 in a desired direction. As shown in FIG. 12, the drive means 18 is a vertically oriented elongate planar shaped member 60. Member 60 is fixed at one end to the conveyor chain 20 and at its opposite end member 60 has notches 38. The notches 38 are on both sides of member 60 for engaging the transverse axle 12 of wheel assembly 8 in combination with the second transverse axle 32 of second wheel assembly 28, which permits travel in a forward or backward direction. Drive means 18 functions in a similar manner when only wheel assembly 8 is used, as shown in FIG. 3. Chain 20 is any standard commercially available conveyor chain having both vertical 62 and lateral 64 load carrying wheels. A top plan view of the conveyor system accessory of FIG. 3 is shown in FIG. 4.

Carrying means 14 is rotatably attached to wheel assembly 8 as shown in FIG. 3. Alternatively, carrying means 14 is rotatably connected to longitudinal member 34, which connects wheel assembly 8 to the second wheel assembly 28, as shown in FIG. 1. The carrying means or load pendant 14 must either swivel or rotate so that it remains vertically oriented as the travel pitch of the wheel assembly changes from 0° pitch to 90° pitch. As is known in the art, depending on the use of the inverted continuous conveyor track of the present invention, the carrying means or load pendant 14 may be situated so that the work piece is positioned either internally or externally to the conveyor track.

Several types of carrying means or load pendants 14 are commercially available from the manufacturers mentioned above. The type of load pendant used will depend on the applications in which the conveyor system is used. For example, depending on the application, a standard clevis load pendant may be appropriate. Other load pendants which may be useful in the present invention include a rigid "V" pendant, a double suspension load hook, a suspension indexing load hook and a double suspension rotating star pendant, to name a few.

Figure 11:
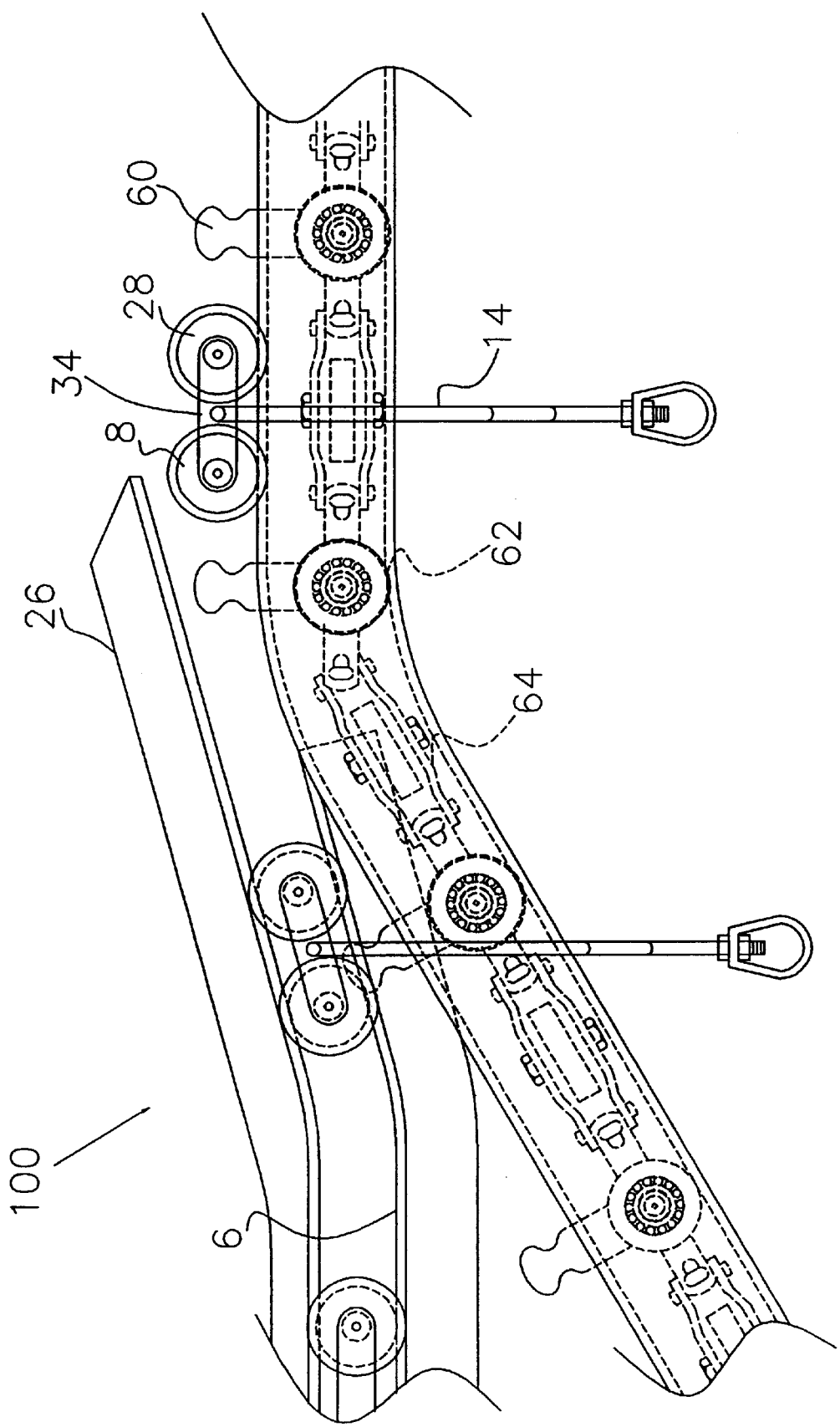
FIG. 11 is the side view of the conveyor system accessory of FIG. 1 showing an unloading or exiting means.

Loading means 4 is shown in FIGS. 1, 3, 5, and 8. Loading means 4 positions the wheel assembly 8 either alone or in combination with the second wheel assembly 28 on the top surface or rail 16 of inverted continuous conveyor track 2. Angle iron or guide 26 may also be present to facilitate the loading of wheel assemblies 8 and 28. Rising or dipping ramps, which utilize the flow of gravity are used for loading means 4 and unloading means 6. Alternatively, manual power ramps may transport the wheel assemblies on to and off of the inverted continuous conveyor track 2. As shown in FIG. 11, unloading means 6 is a downward slopping exit ramp. Unloading means 6 has a slot or cut out, not shown, to facilitate the downward motion and disengagement of drive means 18. Preferably, the loading means 4 and the unloading means or exit means 6 are placed in a run of straight track.

Figure 13:
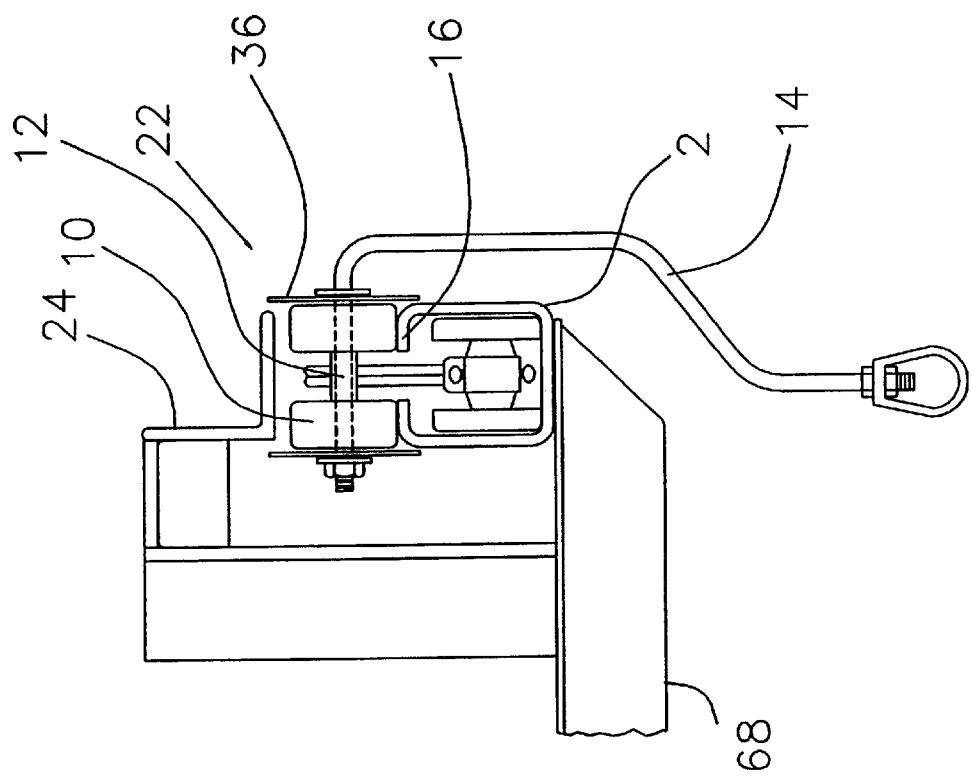
FIG. 13 is a cross section of a conveyor system accessory of the present invention with supports and top angle iron guides.
Figure 14:
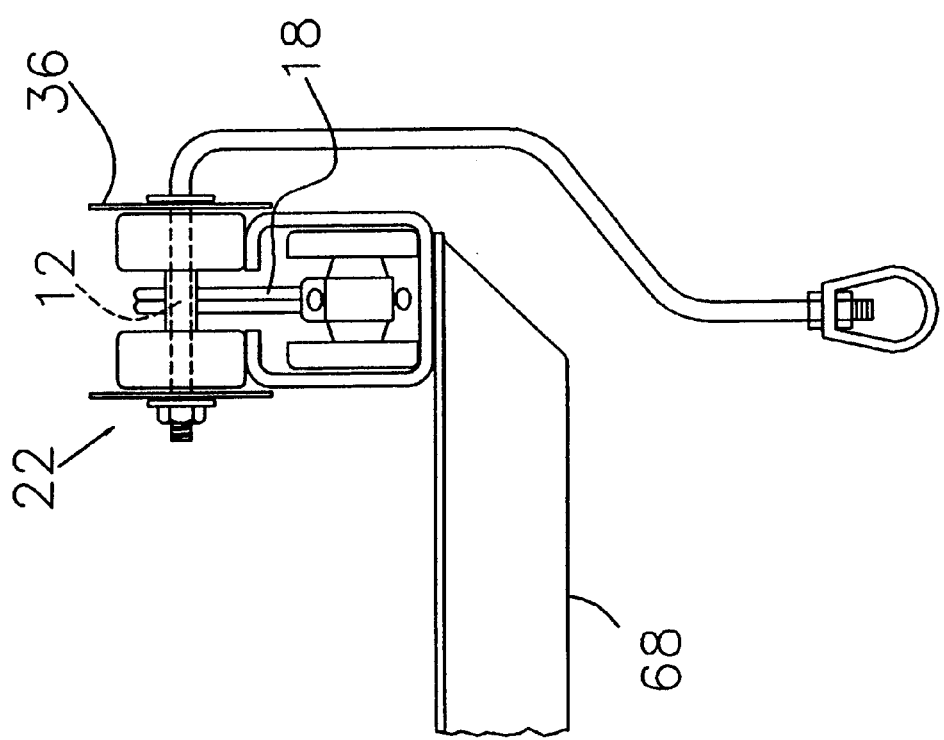
FIG. 14 is a cross section of yet another conveyor system accessory of the present invention with supports and no top angle iron guide.

Turning now to FIGS. 13 and 14 the alignment means 22 of the present invention will be described in more detail. As shown in FIG. 13, alignment means 22 secures the wheel assembly 8 or the combination of wheel assembly 8 and second wheel assembly 28 on the top surface or rail 16 of the inverted continuous conveyor track 2. In an embodiment in which wheel assembly 8 is used to carry a work piece alignment means 22 is a plate 36 that is fixedly attached to each of the wheels of the pair of wheels 10 of wheel assembly 8. Plate 36 is located on an external surface of each of the wheels and is perpendicular to transverse axle 12. Plate 36 extends beyond each wheel and overlaps a portion of both sides of the inverted continuous conveyor track 2. Accordingly, plate 36 forms a boundary, which maintains wheel assembly 8 on the top surface 16 of the inverted conveyor track 2.

In an alternative embodiment in which the wheel assembly 8 is used in combination with second wheel assembly 28, plate 36 is fixedly attached to each of the wheels of the pairs of wheels 10 and 30 of the combination of wheel assembly 8 and second wheel assembly 28. Again, plate 36 is situated on an external surface of each of the wheels. Plate 36 is perpendicular to the respective transverse axles 12 and 32 and extends beyond each wheel. Further, plate 36 overlaps a portion of both sides of the inverted continuous conveyor track 2 and forms a boundary for retaining the combination of wheel assembly 8 and second wheel assembly 28 securely on the top surface 16 of the inverted conveyor track 2.

FIG. 13 also shows guide 24, which may be used in conjunction with alignment means 22. Guide 24 may be an angle iron, channel iron or tubing retainer to ensure that the wheel assemblies or trolleys stay in position between two dogs 60, as shown in FIG. 12.

Figure 8:
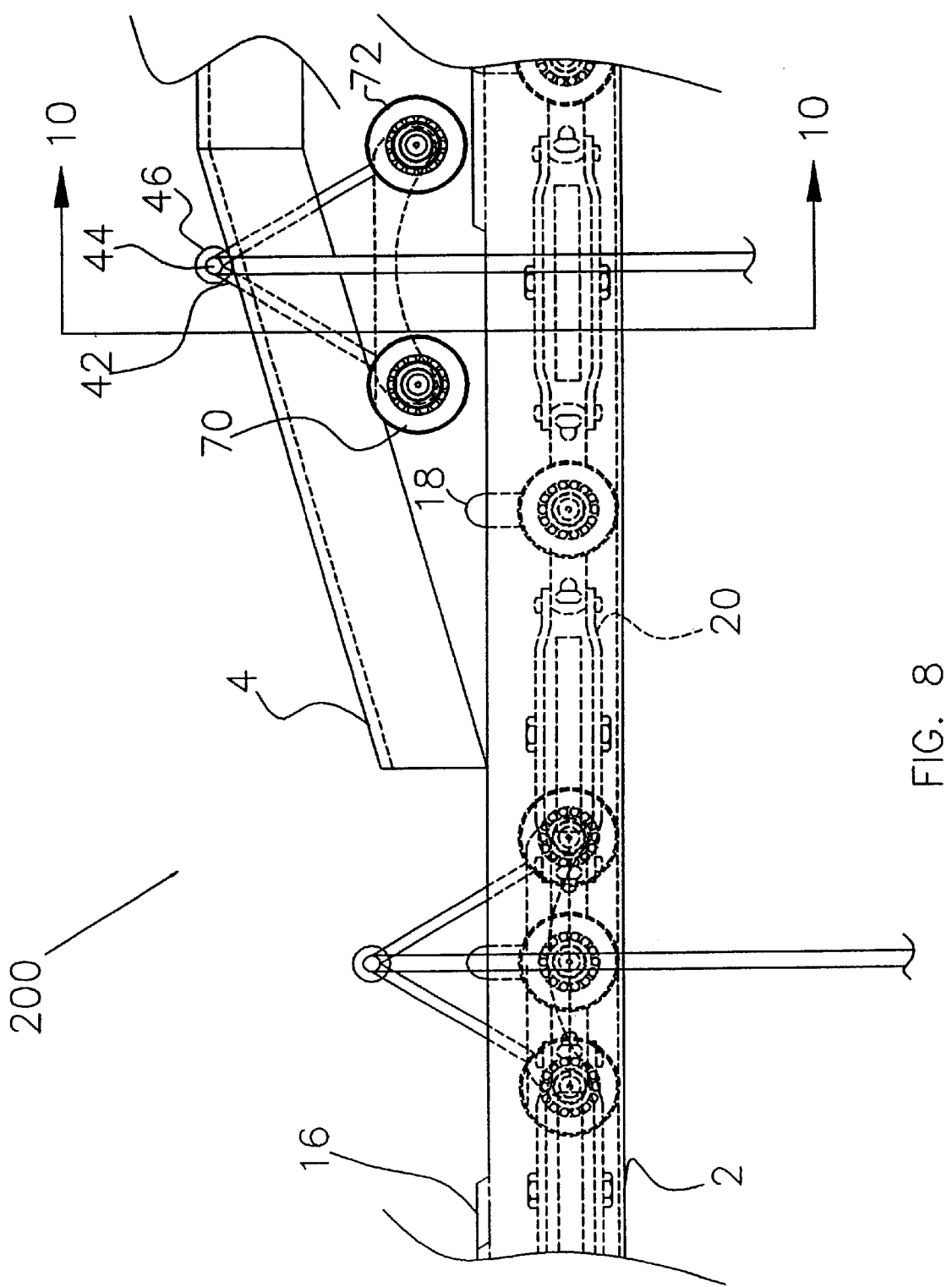
FIG. 8 is a side view of an internal part carrier conveyor system accessory of the present invention.
Figure 9:
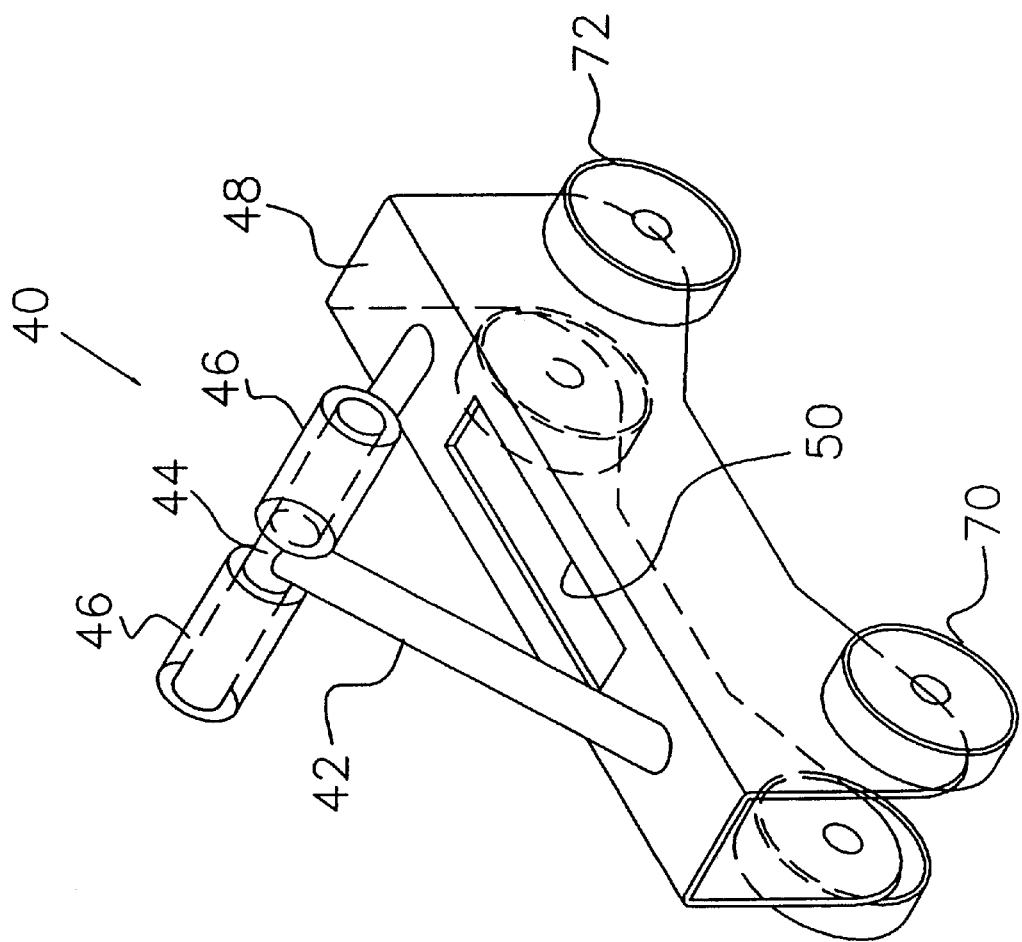
FIG. 9 is isometric view of the wheel assembly of FIG. 8.
Figure 10:
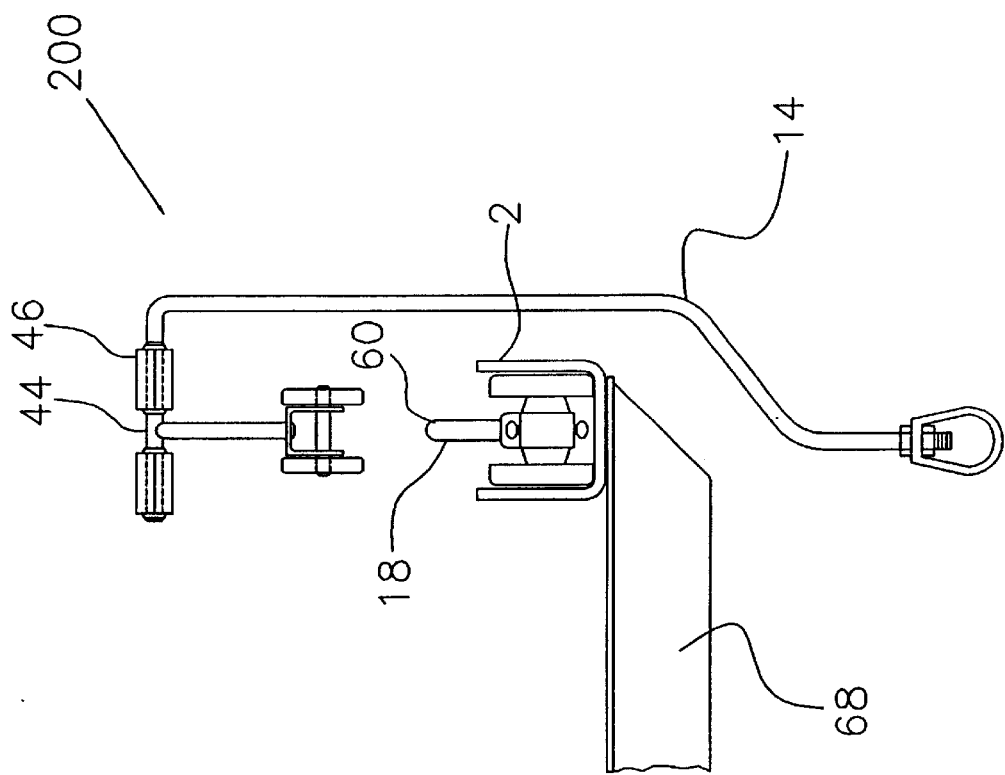
FIG. 10 is a cross-section of the conveyor system accessory of FIG. 8, taken alone lines 10—10 thereof with the entrance ramp removed for clarity.

A further embodiment of the present invention, denoted as a whole by reference numeral 200, is shown in FIGS. 8–10. As shown in FIG. 9, wheel assembly 40 is designed to intermesh with conveyor chain 20. In particular, wheel assembly 40 defines an inverted V-shaped assembly 42. The inverted V-shaped assembly 42 has a transverse member 44 across an apex of the V-shaped assembly 42. Transverse member 44 has rollers 46 on either side of the apex for rolling on a loading means or ramp 4 and unloading means or ramp 6. The inverted V-shaped assembly 42 is attached to a housing 48. Housing 48 has a pair of wheels 70 at its front end and a pair of wheels 72 at its rear end. Each of the pair of wheels 70 and 72 are spaced apart in a parallel side by side relationship and connected to the housing 48. Housing 48 has a cut out or slot 50 to accommodate drive means 18. Drive means 18 is positioned on the conveyor chain to engage slot 50 of the housing 48 of wheel assembly 40. Carrying means 14 extends from transverse member 44.

As shown in FIG. 8, rail 16 has been cut away to facilitate the intermeshing of wheel assembly 40 with conveyor chain 20. A standard conveyor chain 20 has a normal center line of eight (8) inches. It is within the skill of the art to make adjustments in the center line of the conveyor chain 20. It has been found that the distance or center line between the links of conveyor chain 20 can be increased to ten (10) inch centers to accommodate meshing wheel assembly 40. An end view of this embodiment is shown FIG. 10.

Housing 48 is an inverted U-shaped assembly having a cut out portion 50 for engagement of the drive means 18. Housing 48 permits the respective pairs of wheels 70 and 72 to straddle a drive portion of the drive means 18 and intermesh with conveyor chain 20.

A further embodiment of the present invention, denoted as a whole as reference numeral 300, is shown in FIGS. 12 and 12a–12c. In this embodiment, wheel assembly 52 rides on the top surface 16 of the inverted continuous conveyor track 2. Wheel assembly 52 has a pair of V-shaped rollers 54, which are spaced apart and aligned to engage the upper most corners 16 of conveyor track 2. The pair of V-shaped rollers 54 are fixedly attached to a V-shaped angle member 56 by a transverse axle 58. The drive means 18 engages the V-shaped angle member 56 to move wheel assembly 52 is a desired direction. Carrying means 14 is rotatably attached to wheel assembly 52. Loading means 4 and unloading means 6 are also used in conjunction with wheel assembly 52. Further, drive means 18 engages the V-shaped angle member 56 of wheel assembly 52.

Thus, while there has been described what are presently believed to be the preferred embodiments of the invention, those skilled in the art will understand that other and further modifications can be made without departing from the spirit of the invention. It is intended that the present invention includes all such modifications as come within the true scope of the invention as set forth in the claims.

What is claimed is:

1. A single track continuous conveyor system accessory comprising:

a wheel assembly for riding on a top surface of an inverted continuous conveyor track, said wheel assembly having a pair of V-shaped rollers spaced apart and aligned to engage the upper most corners of said inverted continuous conveyor track, said pair of V-shaped rollers fixedly attached to a V-shaped angle member by a transverse axle;

drive means for a conveyor chain positioned in said inverted continuous conveyor track to engage said V-shaped angle member and move said wheel assembly in a desired direction; and carrying means for transporting a work piece thereon rotatably attached to said wheel assembly.

2. The single track continuous conveyor system accessory according to claim 1, further comprising:

loading means for positioning said wheel assembly on said top surface of said inverted continuous conveyor track; and unloading means for removing said wheel assembly from said top surface of said inverted continuous conveyor track.

3. The single track continuous conveyor system accessory according to claim 1, wherein said drive means comprises:

a vertically oriented elongate planar shaped member fixed at one end to said conveyor chain and at its opposite end having notches on both sides of said planar shaped member, said notches for engaging said V-shaped angle member of wheel assembly.

* * * * *